United States Patent [19]
Roberts

[11] Patent Number: 5,513,029
[45] Date of Patent: Apr. 30, 1996

[54] METHOD AND APPARATUS FOR MONITORING PERFORMANCE OF OPTICAL TRANSMISSION SYSTEMS

[75] Inventor: Kim B. Roberts, Kanata, Canada

[73] Assignee: Northern Telecom Limited, Montreal, Canada

[21] Appl. No.: 261,350

[22] Filed: Jun. 16, 1994

[51] Int. Cl.⁶ .......................... H04B 10/16; H04B 10/18
[52] U.S. Cl. ..................... 359/177; 359/110; 359/187; 359/161
[58] Field of Search ................................. 359/177, 110, 359/187, 161; 372/26

[56] References Cited

U.S. PATENT DOCUMENTS

| | | | |
|---|---|---|---|
| 4,277,846 | 7/1981 | Chen | 359/187 |
| 4,369,525 | 1/1983 | Breton | 359/187 |
| 4,399,566 | 8/1983 | Roullet | 359/187 |
| 4,864,649 | 9/1989 | Tajima | 359/187 |
| 4,995,100 | 2/1991 | Stallard | 359/187 |
| 5,282,074 | 1/1994 | Miyazaki | 359/177 |
| 5,287,366 | 2/1994 | Epworth | 372/26 |
| 5,311,005 | 5/1994 | Visocchi | 359/187 |
| 5,373,387 | 12/1994 | Bosch | 359/187 |
| 5,374,973 | 12/1994 | Maxham | 359/177 |

FOREIGN PATENT DOCUMENTS

| | | | |
|---|---|---|---|
| 0343725 | 11/1989 | European Pat. Off. | 359/187 |
| 0151040 | 7/1987 | Japan | 359/187 |
| 2240228 | 7/1991 | United Kingdom | 359/177 |

*Primary Examiner*—Leslie Pascal
*Attorney, Agent, or Firm*—C. W. Junkin

[57] ABSTRACT

In methods and apparatus for monitoring the performance of optical transmission systems, an optical signal is modulated with a low frequency dither signal to provide a modulated optical signal having a known modulation depth. A portion of the optical signal is tapped, and both a total power and a dither amplitude of the tapped portion of the optical signal are measured. Both signal and noise components of the tapped portion of the optical signal are estimated by comparing the measured dither amplitude to the measured total signal power. In wavelength division multiplexed optical transmission systems, optical signals at each distinct wavelength are modulated with distinct dither signals and dither amplitudes of each distinct dither signal detectable in the tapped portion of the optical signal are measured. Both signal and noise components are estimated for the optical signals at each distinct wavelength. The relative signal powers of optical signals at distinct wavelengths are controlled in response to the measured dither amplitudes. The methods and apparatus are particularly applicable to high capacity long haul terrestrial optical fiber transmission systems using optical amplifiers.

32 Claims, 7 Drawing Sheets

METHOD AND APPARATUS FOR MONITORING PERFORMANCE OF OPTICAL TRANSMISSION SYSTEMS

FIELD OF INVENTION

This invention relates to methods and apparatus for monitoring the performance of optical transmission systems and is particularly applicable to optical transmission systems using optical amplifiers, such as Erbium Doped Fiber Amplifiers (EDFAs).

BACKGROUND OF INVENTION

The distance between optical terminals of optical fiber transmission systems is limited by the optical power that can be launched into optical fiber by optical transmitters of the optical terminals, the loss and dispersion of optical fiber interconnecting the optical terminals, and the sensitivity of optical receivers of the optical terminals. Where the distance between desired end points of an optical fiber transmission system exceeds the maximum distance between optical terminals, optoelectronic repeaters have been provided. Each optoelectronic repeater comprises an optical receiver for converting the optical signal to an electrical signal, electronics for regenerating the electrical signal, and an optical transmitter for converting the regenerated electrical signal to an optical signal for transmission to the next optoelectronic repeater or to a terminal of the system.

In Wavelength Division Multiplexed (WDM) optical fiber transmission systems which use optoelectronic repeaters, the optical signals are optically demultiplexed at each repeater, so that the signal at each distinct wavelength is coupled to a respective optical receiver for conversion to a respective electrical signal, each respective electrical signal is separately regenerated, each regenerated signal is applied to a respective optical transmitter operating at a distinct wavelength, and the transmitted signals are optically multiplexed for transmission to the next optoelectronic repeater or to a terminal of the system.

The performance of optoelectronic repeaters must be monitored so that faults in operation of the transmission system can be isolated to faulty repeaters or terminals, and maintenance personnel can be dispatched to appropriate locations with appropriate information and equipment to correct the faults. The performance of the optoelectronic repeaters is generally assessed by monitoring characteristics of the regenerated electrical signals at each repeater.

As the line rates of optical fiber transmission systems increase into the 2.5 Gbps to 10 Gbps range, higher speed electronics are needed in optoelectronic repeaters, and this increases the cost of optoelectronic repeaters.

Optical amplifiers, for example Erbium Doped Fiber Amplifiers (EDFAs), amplify optical signals directly without converting them to electrical signals. Because EDFAs do not require high speed regeneration electronics, they can be cheaper than optoelectronic repeaters for high speed optical fiber transmission systems.

Moreover, in WDM optical fiber transmission systems, the EDFAs can amplify optical signals at multiple wavelengths without optically demultiplexing them, thereby avoiding the costs of optical multiplexing and demultiplexing, and the costs of multiple optical receivers, multiple regeneration circuits and multiple optical transmitters. Consequently, EDFAs can also be cheaper than optoelectronic repeaters for WDM systems.

As in systems using optoelectronic repeaters, performance of transmission systems using EDFAs must be monitored so that faults in the operation of the transmission systems can be isolated to faulty EDFAs or terminals, and maintenance personnel can be dispatched to appropriate locations with appropriate information and equipment to correct the faults. Because regenerated electrical signals are not available for monitoring at EDFAs, performance of EDFAs cannot be monitored using conventional optoelectronic repeater performance monitoring techniques.

Jensen et al disclose a method for monitoring performance of EDFAs in long haul undersea optical fiber transmission systems (R. A. Jensen et al, "Novel technique for monitoring long-haul undersea optical-amplifier systems", OFC '94 Technical Digest, Feb. 20, 1994). High speed optical signals are intensity modulated by a low frequency, low modulation index carrier, the carrier being modulated by a pseudorandom sequence. At each EDFA, a small portion of the optical signal is tapped by an optical coupler and coupled via a high loss optical loopback path to an optical transmission path carrying optical signals back to the terminal from which the optical signal originated. The optical signal received at the originating terminal is digitally correlated with appropriately delayed versions of the transmitted pseudorandom sequence to separate portions of the received signal which result from each optical loopback connection. The separated portions of the received signal are averaged over time to estimate the net gain or loss of the transmission paths to each of the EDFAs and back.

Unfortunately, some faults cannot be isolated using the net gain or loss estimates provided by the monitoring technique of Jensen et al. In particular, some faults degrade the performance of the optical fiber transmission systems by increasing optical noise generated at optical amplifiers rather than by decreasing the net gain of the optical amplifiers. The increased optical noise causes bit errors at terminals of the optical transmission system even though the received optical signal strength meets design objectives.

For example, variations of pump laser wavelength due to aging of pump lasers or due to malfunctions of pump laser temperature control devices can increase optical noise generated by EDFAs. Cabled fiber effects and changes in optical signal wavelength or optical signal strength can change spectral characteristics of optical noise, thereby changing amplification of optical noise relative to optical signals at EDFAs.

Excessive losses at the input end of EDFAs are also difficult to detect from net gain measurements, because such losses are generally compensated by higher gain toward the output end of the EDFAs. However, the compensating gain is applied to optical noise as well as to optical signals, so the net effect is a decreased signal to noise ratio at the output of the faulty EDFA.

SUMMARY OF INVENTION

An object of this invention is to provide methods and apparatus for monitoring performance of optical transmission systems which reduce or overcome some or all of the disadvantages of the monitoring technique described above.

Another object of this invention is to provide methods and apparatus for monitoring performance of optical transmission systems to provide better assessments of the effect of the optical amplifier performance on end-to-end bit error rate performance of optical fiber transmission systems.

Another object of this invention is to provide methods and apparatus for monitoring performance of optical transmission systems which permit isolation of a wider range of faults than can be effectively isolated using the monitoring technique described above.

One aspect of this invention provides a method for monitoring the performance of an optical transmission system. The method comprises modulating an optical signal with a low frequency dither signal to provide a modulated optical signal having a known modulation depth, tapping a portion of the optical signal, measuring a total power of the tapped portion of the optical signal and a dither amplitude of the tapped portion of the optical signal, and estimating both signal and noise components of the tapped portion of the optical signal by comparing the measured dither amplitude to the measured total power.

Because this method monitors both optical noise and optical signal power, it provides a better basis for assessing the effect of optical amplifier performance on the end-to-end bit error rate performance of an optical fiber transmission system. Moreover, because this method monitors both optical noise and optical signal power, it supports isolation and diagnosis of optical amplifier faults that are difficult to isolate and diagnose using estimates of net gain or loss alone. Furthermore, the optical signal and noise powers can be measured at optical amplifiers instead of looping optical signals back for measurement at terminals of the transmission system. This method provides absolute power measurements which have less accumulated error than absolute power estimates calculated from optical signals looped back to terminals of the transmission system.

Portions of the optical signal may be tapped at both an optical input and an optical output of an optical amplifier, and total powers and dither amplitudes may be measured for both tapped portions of the optical signal. This permits estimation of signal and noise components for both tapped portions of the optical signal.

Knowing the optical signal and noise levels at both inputs and outputs of optical amplifiers permits even more accurate fault isolation and diagnosis.

The low frequency dither signal may be a pseudorandom sequence which encodes the known modulation depth of the dither signal, and the step of estimating signal and noise components may comprise decoding at the optical amplifier the modulation depth of the dither signal.

This feature permits use of optical amplifiers of common design with a variety of different optical transmitters which may apply dither modulation of different modulation depths to transmitted optical signals consequently, optical transmitters may be changed without reprogramming the optical amplifiers to take account of different dither modulation depths used by the new optical transmitters.

The dither signal may be such as to suppress non-linear optical effects such as Stimulated Brillouin Scattering (SBS) by broadening the emission spectrum of lasers used in optical transmitters. For example, the low frequency dither signal may be a Miller encoded pseudorandom sequence which may be bandpass filtered to provide substantially uniform spectral broadening without unacceptable degradation in jitter performance. The low frequency dither signal may be a 64 kbps pseudorandom sequence which is Miller encoded and bandpass filtered to pass spectral components between 10 kHz and 40 kHz.

The monitored data may be sent to remote locations for remote monitoring of the optical amplifier. For example, a series connection of several optical amplifiers of a transmission system may be monitored from an optical terminal of the transmission system by sending the monitored data from each optical amplifier to the optical terminal. The monitored data may be encoded into overhead bits of an optical signal for transmission to remote locations.

Another aspect of the invention provides a method for monitoring the performance of a wavelength division multiplexed optical transmission system. The method comprises modulating an optical signal with a low frequency dither signal at each optical transmitter of the system to provide modulated optical signals having known modulation depths. The low frequency dither signals encode the wavelengths of the optical transmitters. A portion of the optical signal is tapped, and a total power and dither amplitudes of each distinct dither signal detectable in the tapped portion of the optical signal are measured. Signal and noise components of the tapped portion of the optical signal are estimated by comparing the measured dither amplitudes to the measured total signal power.

The low frequency dither signals which encode distinct transmitter wavelengths may be substantially orthogonal pseudorandom sequences to ensure that the dither amplitudes of signals at distinct wavelengths are separately measurable.

Relative signal powers of optical signals at distinct wavelengths may be controlled in response to the measured dither amplitudes.

The optical signal may be tapped at one or more optical amplifiers of the wavelength division multiplexed optical transmission system and the relative signal powers of optical signals at distinct wavelengths may be controlled in response to the measured dither amplitudes to compensate for unequal gains at different wavelengths in the optical amplifier.

Another aspect of this invention provides apparatus for monitoring the performance of optical transmission systems. The apparatus comprises an optical tap for tapping a portion of an optical signal, an opto-electronic conversion device for converting the tapped portion of the optical signal to an electrical signal, and a calculation arrangement responsive to the electrical signal for estimating a total power of the optical signal and for estimating a dither amplitude of the optical signal.

The calculation arrangement may comprise a sampler for sampling the electrical signal to derive analog samples, an analog to digital converter for digitally encoding the analog samples, and a microcontroller operable to correlate the digitally encoded samples with a known pseudorandom sequence to estimate the dither amplitude. In some applications, the microcontroller may be operable to correlate the digitally encoded samples with a plurality of known pseudorandom sequences to estimate a plurality of dither amplitudes.

The calculating arrangement may further comprise an analog to digital converter for digitally encoding a DC level of the electrical signal which estimates a total signal power of the optical signal, and the microcontroller may be operable to compare the estimated dither amplitude to the estimated total signal power to estimate a signal component and a noise component of the total optical signal power.

Optical taps and corresponding opto-electronic conversion devices may be provided at both an optical input and an optical output of a monitored optical amplifier, and corresponding calculation arrangements may be used to estimate total powers and dither amplitudes for both optical input and output signals of the optical amplifier. The calculation arrangements may share a common microcontroller.

The microcontroller may be linked to a remote monitoring bus for transmitting monitored data to a remote location.

Yet another aspect of the invention provides an optical transmitter suitable for use with the apparatus for monitoring performance of an optical transmission system. The optical transmitter comprises an optical source for generating an optical signal, a signal modulation arrangement for modulating the optical signal with a high speed data stream, and a dither modulation arrangement for modulating the optical signal with a low speed, small amplitude dither signal having a precisely controlled dither modulation depth fixed at a known value.

The dither modulation arrangement may comprise an optical tap for tapping a portion of an optical signal at an output of the optical transmitter, an opto-electronic conversion device for converting the tapped portion of the optical signal to an electrical signal, a calculation arrangement responsive to the electrical signal for estimating a total optical signal power of the optical signal and for estimating a dither amplitude of the optical signal, and a dither amplitude control arrangement responsive to the estimated total signal power and the estimated dither amplitude for fixing the dither amplitude at the known value.

The calculation arrangement may comprise a sampler for sampling the electrical signal to derive analog samples, an analog to digital converter for digitally encoding the analog samples, and a microcontroller operable to estimate the dither amplitude based on the digitally encoded samples. The dither amplitude control arrangement may comprise a digital to analog converter responsive to a digital code supplied by the microcontroller to define an analog signal level, a chopper responsive to a signal supplied by the microcontroller and to the analog signal level to define pulses having a pulse amplitude substantially equal to the analog signal level, and a controllable current source responsive to the pulses to modulate a bias current of the optical source.

The microcontroller may be operable to provide a signal to the chopper which defines a pseudorandom sequence and to correlate the digitally encoded analog samples with the pseudorandom sequence to estimate the dither amplitude.

Another aspect of the invention provides an optical transmission system comprising an optical transmitter, an optical receiver and at least one monitoring arrangement connected between the optical transmitter and the optical receiver. The optical transmitter comprises an optical source for generating an optical signal, a signal modulation arrangement for modulating the optical signal with a high speed data stream, and a dither modulation arrangement for modulating the optical signal with a low speed, small amplitude dither signal having a precisely controlled dither modulation depth fixed at a known value. Each monitoring arrangement comprises an optical tap for tapping a portion of the optical signal, an opto-electronic conversion device for converting the tapped portion of the optical signal to an electrical signal, and a calculation arrangement responsive to the electrical signal for estimating a total optical signal power of the optical signal and for estimating a dither amplitude of the optical signal.

The optical transmitter may encode the known dither modulation depth in the dither signal and the optical amplifier may decode the known dither modulation depth from the dither signal.

Another aspect of the invention provides a wavelength division multiplexed optical transmission system which comprises a plurality of optical transmitters, a plurality of optical receivers and at least one monitoring arrangement connected between the optical transmitters and the optical receivers. Each optical transmitter comprises an optical source for generating an optical signal at a distinct wavelength, a signal modulation arrangement for modulating the optical signal with a high speed data stream, and a dither modulation arrangement for modulating the optical signal with a distinct low speed, small amplitude dither signal having a precisely controlled dither modulation depth fixed at a known value. Each monitoring arrangement comprises an optical tap for tapping a portion of the optical signals, an opto-electronic conversion device for converting the tapped portion of the optical signals to an electrical signal, and a calculation arrangement responsive to the electrical signal for estimating a total optical signal power of the optical signals and for estimating a dither amplitude of each optical signal. Each optical receiver receives an optical signal from a corresponding optical transmitter.

The wavelength division multiplexed optical transmission system may further comprise a remote monitoring unit located with the optical transmitters and a communication channel between at least one monitoring arrangement and the remote monitoring unit for communicating monitored data from the monitoring arrangement to the remote monitoring unit.

The remote monitoring unit may be responsive to the monitored data to control an optical signal strength of the optical signals generated by each optical transmitter. Alternatively or additionally, at least one optical amplifier may be responsive to the monitored data to control an optical gain profile of the optical amplifier, or at least one optical filter in the optical transmission path may be responsive to the monitored data to control relative strengths of optical signals at different wavelengths.

BRIEF DESCRIPTION OF DRAWINGS

Embodiments of the invention are described below by way of example only. Reference is made to accompanying drawings in which.

DETAILED DESCRIPTION

Figure 1:
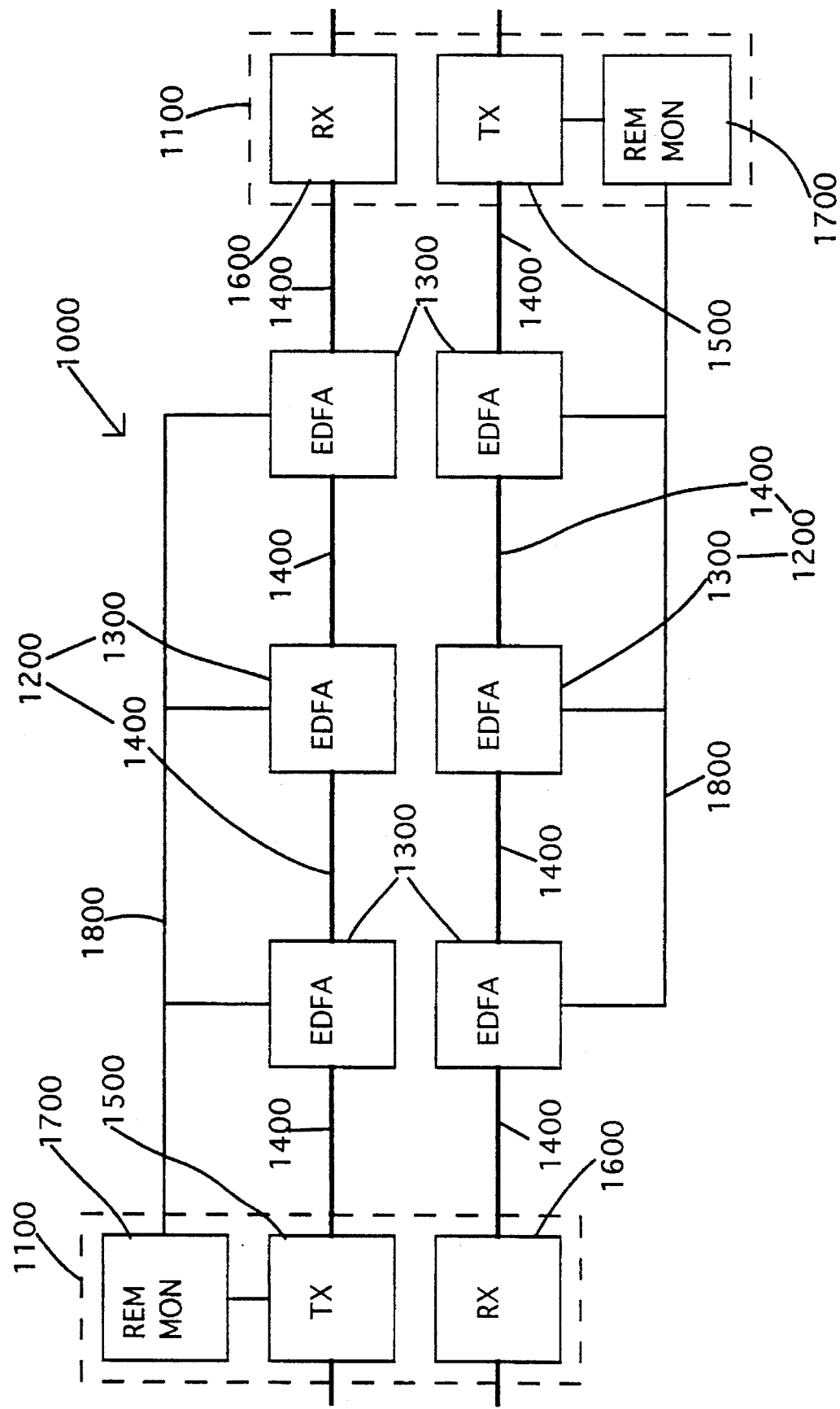
FIG. 1 is a block schematic diagram of an optical fiber transmission system according to an embodiment of the invention.

FIG. 1 is a block schematic diagram of an optical fiber transmission system 1000 according to an embodiment of the invention. The transmission system 1000 comprises a pair of optical terminals 1100 which are interconnected by a pair of optical transmission lines 1200, each optical transmission line 1200 comprising a chain of Erbium Doped Fiber Amplifiers (EDFAs) 1300 serially connected via sections 1400 of cabled optical fiber.

Each optical terminal 1100 comprises an optical transmitter 1500 and an optical receiver 1600. The optical transmitters 1500 convert high speed (approximately 2.5 Gbps) electrical data signals to optical signals for transmission over the optical transmission line 1200 to corresponding optical receivers 1600 which reconvert received optical signals to electrical signals. Each optical terminal 1100 also comprises a remote monitoring unit 1700 which is connected to downstream EDFAs 1300 via a remote monitoring bus 1800.

Figure 2:
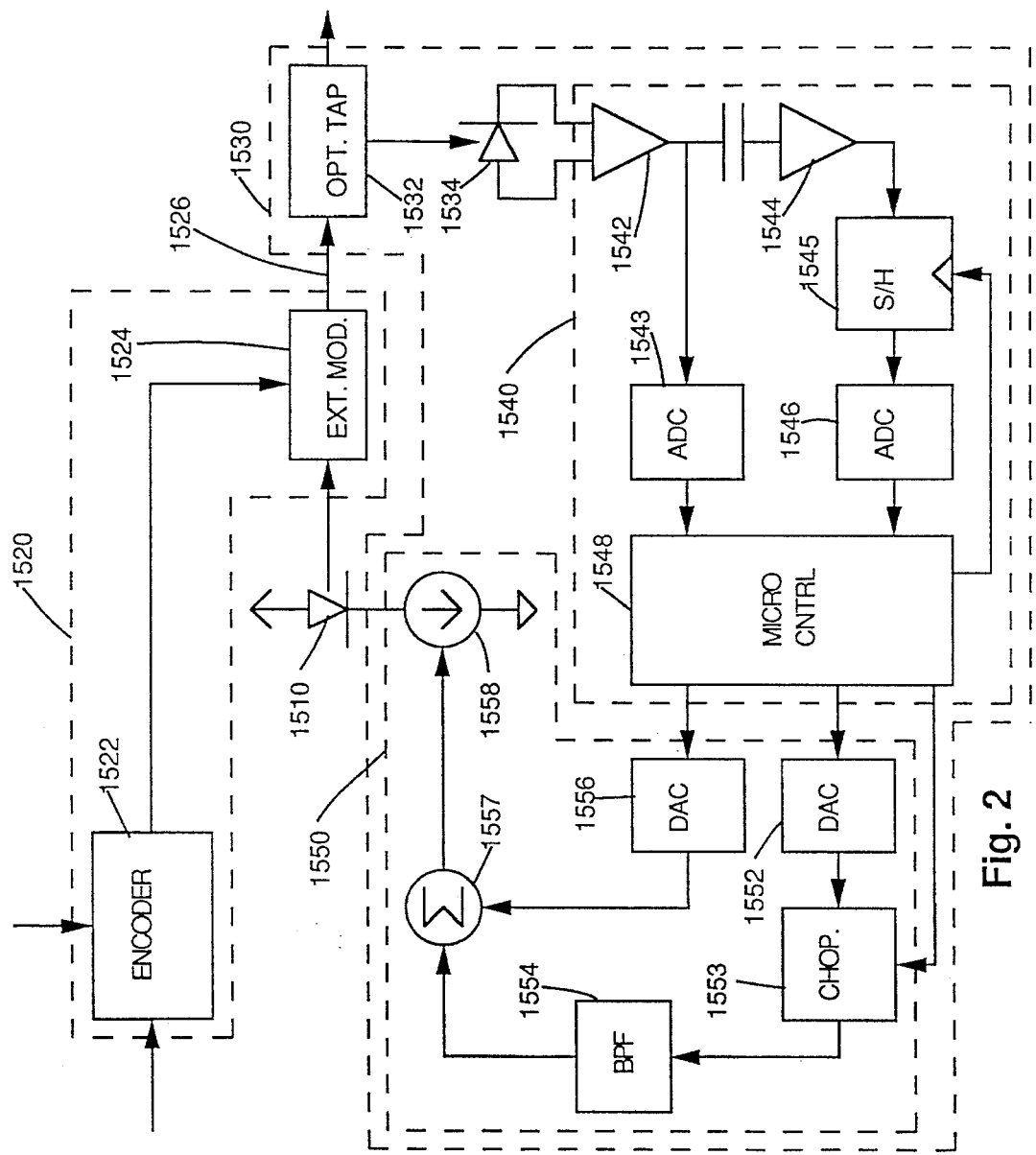
FIG. 2 is a block schematic diagram of an optical transmitter of the transmission system of FIG. 1.

FIG. 2 is a block schematic diagram of one of the optical transmitters 1500. The optical transmitter 1500 comprises an optical source in the form of a semiconductor laser 1510, a signal modulation arrangement 1520 in the form of a line encoder 1522 and an external optical modulator 1524, and a dither modulation arrangement 1530. The dither modulation arrangement 1530 comprises an optical tap 1532, an opto-electronic conversion device in the form of a PIN diode 1534, a calculation arrangement 1540, and a dither amplitude control arrangement 1550. The calculation arrangement 1540 comprises a transimpedance amplifier 1542, a first analog to digital converter 1543, an AC amplifier 1544, a sample and hold circuit 1545, a second analog to digital converter 1546, and a microcontroller 1548. The dither amplitude control arrangement 1550 comprises a first digital to analog converter 1552, a chopper 1553, a bandpass filter 1554, a second digital to analog converter 1556, a summer 1557, and a voltage controlled current source 1558.

The first digital to analog converter 1552 applies an analog signal to a signal input of the chopper 1553, the analog signal having a signal level corresponding to a first digital code supplied to the digital to analog converter 1552 by the microcontroller 1548. The microcontroller 1548 repeatedly applies a 64 bit Miller encoded pseudorandom sequence to a control input of the chopper 1553 to modulate the analog signal at 64 kbps. The modulated signal is filtered by the bandpass filter 1554 and applied to a first input of the summer 1557. The second digital to analog converter 1556 applies to a second input of the summer 1557 an analog signal having a level corresponding to a second digital code supplied by the microcontroller 1548. The summer 1557 applies a resulting summation signal to a control input of the voltage controlled current source 1558 to control a bias current of the semiconductor laser 1510. Consequently, the semiconductor laser 1510 emits an optical signal modulated by a 64 kbps low modulation index dither signal.

The dither modulated optical signal is applied to the external optical modulator 1524 which responds to a high speed (approximately 2.5 Gbps) electrical data signal supplied by the line encoder 1522 to superimpose a high speed, high modulation index data modulation on the dither modulation of the optical signal. The twice modulated optical signal is coupled to an output fiber 1526 of the optical transmitter 1500.

The optical tap 1532 couples approximately 3% of the modulated optical signal on the output fiber 1526 to the PIN diode 1534. The PIN diode 1534 converts the tapped optical signal to a photocurrent, and the transimpedance amplifier 1542 amplifies and converts the photocurrent to a voltage. The first analog to digital converter 1543 converts the analog voltage to digital code which estimates the total optical power of the tapped optical signal, and this digital code is supplied to the microcontroller 1548. The estimate of the total optical power is used to adjust the second digital code supplied by the microcontroller 1548 to adjust the DC bias point of the semiconductor laser 1510 so as to maintain the total optical power at a desired operating point.

The AC amplifier 1544 is AC coupled to the transimpedance amplifier 1542 and provides further amplification of an AC component of the voltage. The sample and hold circuit 1545 samples the amplified AC voltage at a rate of 1 kbps, taking one sample from each successive repetition of the 64 bit pseudorandom sequence using a repetitive sampling technique which is commonly used in digital oscilloscopes. The second analog to digital converter 1546 converts the analog samples to digital codes which are supplied to the microcontroller 1548. The microcontroller 1548 correlates the digitally encoded AC signal with the pseudorandom sequence applied to the chopper 1553 to compute the amplitude of the dither modulation in the tapped optical signal, compares the dither modulation amplitude to the estimated total power of the tapped optical signal to compute the dither modulation depth, and adjusts the first digital code supplied by the microcontroller 1548 to fix the dither modulation depth at a known and precisely controlled value.

Consequently, the optical tap 1532, the PIN diode 1534, the calculation arrangement 1540, and the dither amplitude control arrangement 1550 together define a feedback loop for precise control of the dither modulation depth and the total optical output power. The calculation algorithm of the microcontroller 1548 and the operating parameters of the circuit elements which define the feedback loop are selected to provide a first order response having a time constant of approximately 10 seconds. This relatively slow response is selected to provide good rejection of noise and transients.

Figure 3:
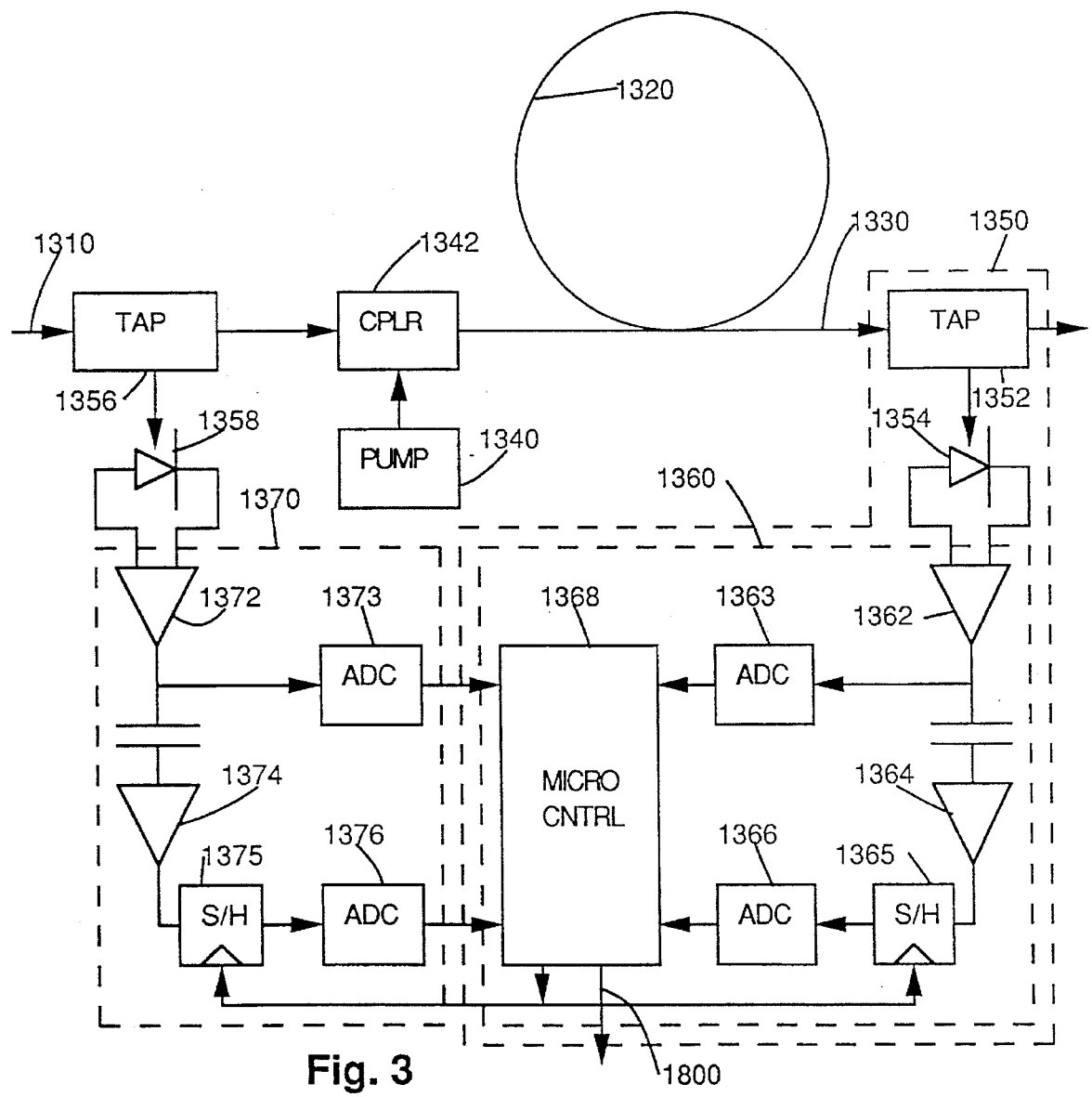
FIG. 3 is a block schematic diagram of an Erbium Doped Fiber Amplifier (EDFA) of the transmission system of FIG. 1.

FIG. 3 is a block schematic diagram of an EDFA 1300 of the transmission system 1000. The EDFA 1300 comprises an input fiber 1310, a length of erbium doped fiber 1320 and an output fiber 1330 connected in series, a pump laser 1340 coupled to the erbium doped fiber 1320 by an optical coupler 1342, and a performance monitoring arrangement 1350. The performance monitoring arrangement 1350 comprises an output optical tap 1352, an opto-electronic conversion device in the form of a PIN diode 1354 and a first calculation arrangement 1360. The first calculation arrangement 1360 comprises a transimpedance amplifier 1362, a first analog to digital converter 1363, an AC amplifier 1364, a sample and hold circuit 1365, a second analog to digital converter 1366, and a microcontroller 1368.

The output optical tap 1352 couples approximately 3% of the optical signal on the output fiber 1330 to the PIN diode 1354. The PIN diode 1354 converts the tapped optical signal to a photocurrent, and the transimpedance amplifier 1362 amplifies and converts the photocurrent to a voltage. The first analog to digital converter 1363 converts the analog voltage to a digital code which estimates the total optical power of the tapped optical signal, and this digital code is supplied to the microcontroller 1368. The AC amplifier 1364 is AC coupled to the transimpedance amplifier 1362 and provides further amplification of an AC component of the voltage. The sample and hold circuit 1365 samples the amplified AC voltage at a rate of 1 kbps, taking one sample from each successive repetition of the 64 bit pseudorandom sequence using the same known repetitive sampling technique as is used in the optical transmitter 1500. The second analog to digital converter 1366 converts the analog samples to digital codes which are supplied to the microcontroller 1368. The microcontroller 1368 correlates the digitally encoded AC signal with the pseudorandom sequence applied at the optical transmitter 1500 to compute the amplitude of the dither modulation in the tapped optical signal, and compares the dither modulation amplitude to the estimated total power of the tapped optical signal to compute the dither modulation depth of the tapped optical signal.

The microcontroller 1368 compares the measured modulation depth with the known modulation depth of the dither applied at the optical transmitter 1500 to estimate signal and noise components of the optical signal on the output fiber 1330 of the EDFA 1300. In particular, the signal component is given by $S=P\times(d/D)$, where P is the estimated total optical power carried by the output fiber 1330, d is the estimated dither modulation depth at the output fiber 1330, and D is the known dither modulation depth at the optical transmitter 1500. The noise component is given by $N=P\times(1-d/D)$, and the signal to noise ratio (S/N) is given by $S/N=d/(D-d)$. The estimated signal and noise components are encoded by the microcontroller 1368 and transmitted to the remote monitoring unit 1700 at one of the optical terminals 1100 via the remote monitoring bus 1800. The remote monitoring unit 1700 can be programmed to transfer the estimated signal and noise components to the line encoder 1522 of the optical transmitter 1500 of the optical terminal 1100 for encoding into overhead bits of optical signals transmitted to other optical terminals 1100 so that performance data can be collected at a central network site for further analysis.

The performance monitoring arrangement 1350 of the EDFA 1300 may further comprise an input optical tap 1356, another PIN diode 1358 and a second calculation arrangement 1370 similar to the first calculation arrangement 1360, except that it shares the microcontroller 1368 with the first calculation arrangement 1360. The second calculation arrangement 1370 estimates signal and noise components of the optical signal in the input fiber 1310 of the EDFA 1300 to permit more accurate diagnosis and isolation of faults. In particular, estimating signal and noise components at the input fiber 1310 as well as at the output fiber 1330 of the EDFAs 1300 permits faults induced by cabled fiber sections 1400 to be distinguished from faults induced by EDFAs 1300.

For example, a thermoelectric cooler failure at an EDFA 1300 could cause the emission wavelength of a pump laser 1340 of the EDFA 1300 to drift, changing the gain profile of the EDFA 1300 so that more Amplified Spontaneous Emission (ASE) is generated at the EDFA 1300. Inherent and externally applied automatic gain control mechanisms of the EDFA 1300 ensure that the total output power of the EDFA 1300 remains substantially constant, so the failure is not evident from net gain measurements alone. However, if left unattended, the fault could cause an excessive Bit Error Rate (BER) at a receiver 1600 of a downstream optical terminal 1100. When this happens, the optical terminals 1100 invoke a protection switch to circumvent the transmission line 1200 in which the fault has occurred, but maintenance personnel would not be able to isolate the fault to a defective piece of equipment and correct the fault based on net gain information alone. Consequently, costly and time consuming field measurements would be required to isolate and diagnose the fault.

However, with the EDFA performance monitoring arrangement 1350 described above. S/N estimates are " generated for the input and output fibers 1310, 1330 of each EDFA 1300. Under the described fault conditions, a sharp decrease in S/N would appear at the output fiber 1330 of the faulty EDFA 1300 (compared to the S/N at the input fiber 1310 of the same EDFA 1300) permitting isolation of the fault to that EDFA 1300. Consequently, maintenance personnel could be dispatched to the location of the faulty EDFA 1300 to replace it.

A sharp decrease in S/N at the input fiber 1310 of an EDFA 1300 (compared to the, S/N at the output fiber 1330 of the immediately upstream EDFA 1300) indicates a fault in the cabled fiber section connecting the two EDFAs.

Suitable selection of the dither modulation signal avoids unacceptable degradation of the jitter performance of the optical transmission system 1000. For example, Miller encoding of the 64 bit pseudorandom sequence used to generate the 64 kbps dither signal, provides a signal spectrum having a large proportion of its signal power concentrated between approximately 15 kHz and 30 kHz. The bandpass filter 1554 is designed to have a 3 dB passband between 10 kHz and 40 kHz to pass a large proportion of the signal power, while blocking low frequency and high frequency components that could cause unacceptable degradations of jitter performance.

Dither modulation of a suitable depth also helps to suppress Stimulated Brillouin Scattering (SBS) in high power optical fiber transmission systems by broadening the effective emission spectrum of semiconductor lasers 1510 used in optical transmitters 1500. The dither modulation depth needed for effective SBS suppression depends on the maximum optical power present in optical fibers of the system 1000. For a maximum optical power of approximately 13 dBm, a modulation depth of approximately 0.5% rms is appropriate. For greater maximum optical powers, modulation depths of up to 3% rms may be appropriate. Excessive dither modulation depth degrades optical receiver sensitivity. Consequently, optical transmitters 1500 should generally be designed to apply dither modulation having the minimum modulation depth which provides acceptable SBS suppression at their maximum launched optical power level.

The signal and noise components of optical signals at EDFAs 1300 can only be computed with knowledge of the dither modulation depth applied at the upstream optical transmitter 1500. This information can be programmed into the microcontrollers 1368 of the EDFAs during their installation when it is known what level of dither modulation will be applied at the upstream optical transmitter 1500. However, if the upstream optical transmitters 1500 are later replaced with optical transmitters having a different dither modulation depth, all downstream EDFAs must be reprogrammed to provide accurate estimates of signal and noise components.

To avoid this problem, the measurements may be transmitted from the microcontrollers 1368 of the EDFAs 1300 to the remote monitoring unit 1700 of the upstream optical terminal 1100 for computation of signal and noise components. In this case, only the co-located remote monitoring unit 1700 of the optical terminal 1100 having the new optical transmitter need be reprogrammed with the new dither modulation depth.

However, even this limited amount of reprogramming can be avoided by selecting a different pseudorandom sequence for each dither modulation depth that may be applied by an optical transmitter 1500. Each EDFA 1300 can then digitally correlate the tapped optical signals with each candidate pseudorandom sequence and, by identifying the pseudorandom sequence which provides the best correlation, each EDFA 1300 can determine the dither modulation depth applied at the optical transmitter 1500. Preferably the pseudorandom sequences for distinct dither modulation depths are substantially orthogonal so that the pseudorandom sequences can be reliably identified by digital correlation techniques.

The digital correlation techniques used by the optical transmitters 1500 and the EDFAs 1300 to identify specific pseudorandom sequences in the dither modulation and to estimate the dither modulation depth rely on spectral templates calculated for each candidate pseudorandom sequence and stored in firmware of the microcontrollers 1548, 1368. The spectral templates are calculated by taking 256 samples of each 64 bit pseudorandom sequence in the Miller encoded and filtered form in which it is applied to the voltage controlled current source 1558 of the optical transmitter 1500, performing a discrete Fourier transform on the resulting samples, and calculating the complex conjugate of the resulting discrete Fourier spectrum. The spectral templates are collapsed for storage by eliminating data which is not required because the original sequence was real valued, by eliminating data which defines the spectrum above 64 kHz where there is very little signal power, and by eliminating zero values which add no distinguishing characteristics to the templates. The microcontrollers 1548, 1368 also store an empirically determined scaling constant for each template and coefficients which define expected shapes of inverse Fourier transforms resulting from correlation computations for each pseudorandom sequence. The scaling constants are determined by comparing the results of correlation calculations (described below) with actual measurements of dither signal amplitudes, and the shape defining coefficients are determined by correlating each pseudorandom sequence with itself according to the correlation algorithm described below.

The microcontroller 1548 of the optical transmitter 1500 assembles blocks of samples encoded by the second analog to digital converter 1546, each block comprising 256 samples. The 256 samples in each block are taken at different phases of 256 successive repetitions of the dither pseudorandom sequence, so that the pseudorandom sequence is effectively sampled at 256 different sampling points. Each sample in a block is normalized by subtracting a mean value of samples in that block, and a discrete Fourier transform is computed for the block of normalized samples. The resulting Fourier spectrum is collapsed as described above for the spectral templates and multiplied by the spectral template for the pseudorandom sequence applied as dither modulation by the optical transmitter 1500. The microcontroller 1548 computes the inverse Fourier transform of the resulting spectrum, locates the maximum element of the inverse Fourier transform, and multiplies it by the scaling constant that corresponds to the pseudorandom sequence applied as dither modulation by the optical transmitter 1500 to estimate the dither signal amplitude.

The microcontroller 1548 also normalizes selected elements of the inverse Fourier transform with respect to the maximum element and compared the normalized elements with the coefficients stored in memory to compare the shape of the inverse Fourier transform with the shape of the expected inverse Fourier transform. If the shape of the computed inverse Fourier transform substantially matches the shape of the expected inverse Fourier transform, the estimated dither amplitude is used in the feedback loop to adjust the dither amplitude as necessary. However, if the shape of the computed inverse Fourier transform deviates substantially from the shape of the expected Fourier transform, the microcontroller 1548 does not adjust the dither amplitude until the next set of 256 samples have been processed.

The microcontrollers 1368 of the EDFAs 1300 also assemble blocks of samples encoded by the analog to digital converter 1366, 1376, each block comprising 256 samples taken at different phases of 256 successive repetitions of the dither pseudorandom sequence, so that the pseudorandom sequence is effectively sampled at 256 different sampling points. Each sample in each block is normalized by subtracting a mean value of samples in that block, and discrete Fourier transforms are computed for each block of normalized samples. The resulting Fourier spectra are collapsed as described above for the spectral templates. The collapsed Fourier spectra are multiplied by each candidate spectral template, and inverse Fourier transforms of the resulting spectra are computed. The maximum element of each inverse Fourier transform is located and multiplied by the scaling constants corresponding to the templates to estimate the dither signal amplitude for each candidate pseudorandom sequence. The dither signal having the largest estimated amplitude is presumed to be the dither signal applied at the optical transmitter 1500.

The microcontrollers 1368 also normalize selected elements of each inverse Fourier transform with respect to the maximum element of that inverse Fourier transform and compare the normalized elements with the coefficients stored in memory to compare the shapes of the inverse Fourier transforms with the shapes of the expected inverse Fourier transforms for each pseudorandom sequence. If the shapes of the computed inverse Fourier transforms substantially match the shapes of the expected inverse Fourier transforms, the estimated dither amplitudes are used to calculate the monitored parameters. However, if the shapes of the computed inverse Fourier transforms deviate substantially from the shapes of expected Fourier transforms, the microcontroller 1368 holds the current value of the monitored parameters until the next set of 256 samples have been processed.

The microcontroller 1368 averages accepted values of the monitored parameters over time to reduce the effects of noise. For example, the microcontroller 1368 may compute each current value of a monitored parameter by adding 5% of the value of that monitored parameter as computed from the current set of 256 samples to 95% of the previous time averaged value of that parameter.

Figure 4:
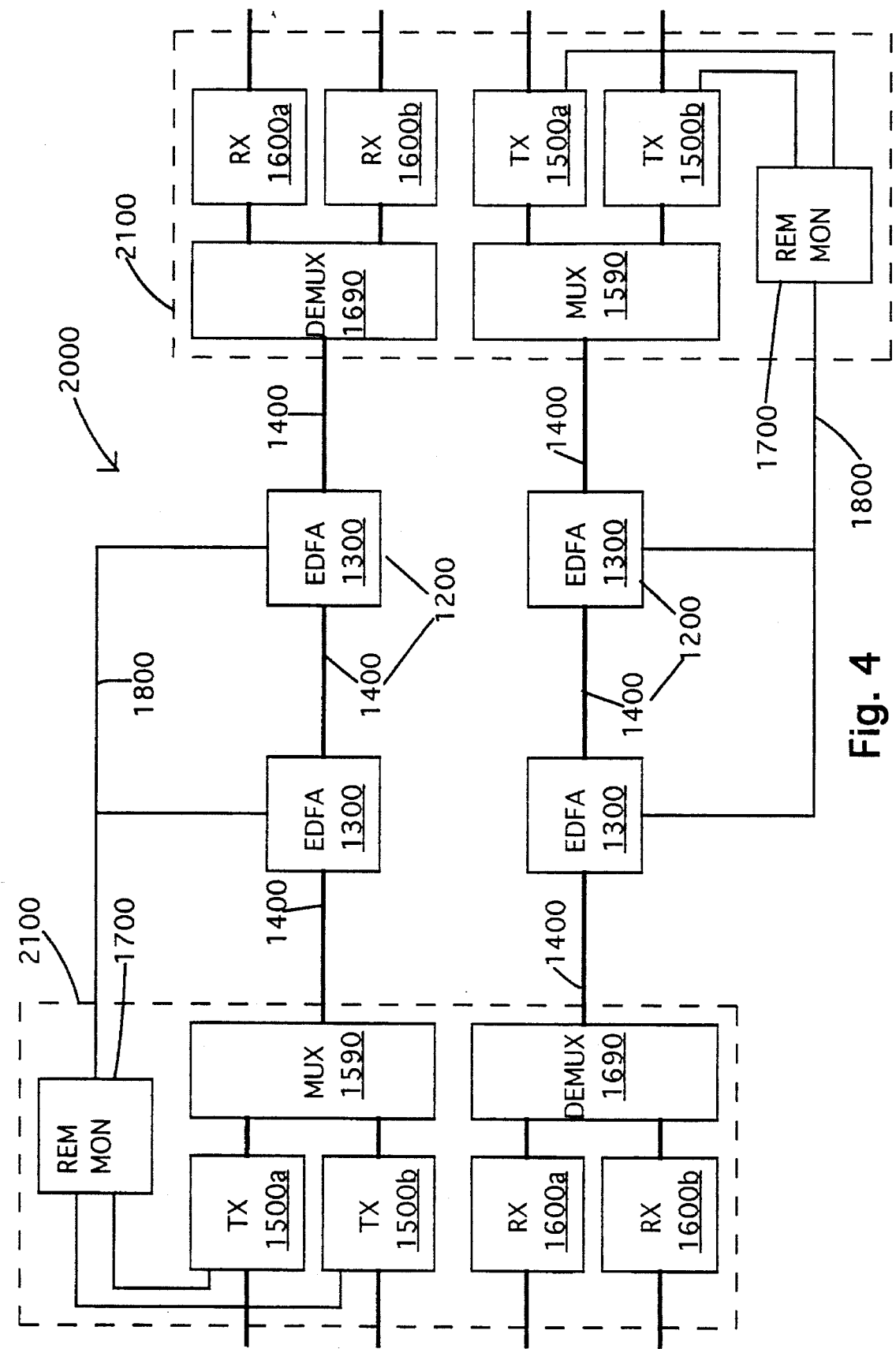
FIG. 4 is a block schematic diagram of a wavelength Division Multiplexed optical transmission system according to another embodiment of the invention.

FIG. 4 is a block schematic diagram of a Wavelength Division Multiplexed (WDM) optical transmission system 2000. The WDM transmission system 2000 comprises a pair of optical terminals 2100 which are interconnected by a pair of optical transmission lines 1200, each optical transmission line 1200 comprising a chain of Erbium Doped Fiber Amplifiers (EDFAs) 1300 serially connected via sections 1400 of cabled optical fiber.

Each optical terminal 2100 comprises a pair of optical transmitters 1500a, 1500b, a pair of optical receivers 1600a, 1600b, an optical multiplexer 1590 and an optical demultiplexer 1690. The optical transmitters 1500a, 1500b convert high speed (approximately 2.5 Gbps) electrical data signals to optical signals. One of the optical transmitters 1500a at each terminal 2100 provides an optical signal having a wavelength of 1533 nm, and the other optical transmitter 1500b at each terminal provides an optical signal having a wavelength of 1557 nm. The two optical signals at each optical terminal 2100 are combined by the optical multiplexers 1590 for transmission over the optical transmission line 1200 to the other terminal 2100. The combined optical signals are separated by the optical demultiplexers 1690 for application to the optical receivers 1600a, 1600b which reconvert received optical signals to electrical signals. Each optical terminal 2100 also comprises a remote monitoring unit 1700 which is connected to downstream EDFAs 1300 via a remote monitoring bus 1800.

Each of the optical transmitters 1500a, 1500b has the configuration shown in FIG. 2. However, in addition to having semiconductor lasers 1510 which emit at different wavelengths, the optical transmitters 1500a, 1500b at each optical terminal 2100 have microcontrollers 1548 programmed to modulate their laser bias currents with different pseudorandom sequences to apply orthogonal low frequency, low modulation depth dither modulations to their respective optical output signals. Consequently, the pseudorandom sequences of the dither modulations are characteristic of the operating wavelengths of the optical transmitters 1500a, 1500b, and can be used to distinguish optical signals originating at the optical transmitters 1500a, 1500b from one another.

This characteristic of the optical signals is used at the EDFAs 1300 of the WDM transmission system 2000 to separately estimate signal components at each of the two operating wavelengths without optically demultiplexing the combined optical signal. The EDFAs 1300 have the configuration shown in FIG. 3 and operate essentially as discussed above, except that the microcontroller 1368 of each EDFA 1300 is programmed to calculate two dither amplitudes and corresponding signal components for each input optical signal and for each output optical signal, one for each operating wavelength of the transmission system 2000.

More generally, in transmission systems employing optical transmitters 1500 operating at several different wavelengths and at several different output powers with corresponding different dither modulation depths, the microcontrollers 1368 of the EDFAs 1300 may be programmed to correlate the tapped signals with several different pseudorandom sequences and compute dither amplitude estimates for several different signal components to provide a wealth of information applicable to the complicated problems of fault isolation and diagnosis in such transmission systems.

In WDM transmission systems, the impact of crosstalk and optical performance degradations are minimized when the optical power at each operating wavelength is substantially equal. However, the gain vs wavelength characteristics of the EDFAs 1300 may not be uniform over the range of operating wavelengths, and may vary over the lifetime of the EDFAs 1300. The remote monitoring units 1700 of the optical terminals 2100 may use the estimated signal powers at the different operating wavelengths received from the EDFAs 1300 to detect imbalances in the signal strengths at different operating wavelengths and may apply control signals to the optical transmitters 1500a, 1500b to adjust the transmitted optical powers so as to compensate for such imbalances.

Additionally or alternatively, control signals may be applied to the EDFAs 1300 to modify their gain profiles so as to compensate for imbalances in the signal powers at distinct operating wavelengths. For example, if each EDFA 1300 is pumped by two or more pump lasers 1340 operating at different wavelengths, the relative outputs of the pump lasers 1340 could be adjusted by the control signals to modify the gain profiles of the EDFAs 1300. The control signals may also be used to adjust tunable optical filters to compensate for imbalances in the signal powers at distinct operating wavelengths.

The embodiments described above may be modified without departing from the principles of the invention. For example, the invention may be applied to bidirectional optical transmission systems in which optical signals are propagated in opposite directions on a common optical fiber. Generally in such systems, the counter-propagating optical signals are separated for application to separate EDFAs 1300 where optical amplification is required.

The invention is also applicable to optical transmission systems in which EDFAs 1300 are used as "post amplifiers" located immediately downstream of optical transmitters 1500 to boost their power output before the optical signal is launched into the transmission line 1200, and to optical transmission systems in which EDFAs 1300 are integrated into optical transmitters 1500 as optical output stages. In the latter case, the optical taps 1356, low speed electronics 1370, and the microcontroller 1368 used to monitor the performance of the integrated EDFAs 1300 may be used as part of the feedback loop controlling the dither modulation depth of the optical transmitter 1500.

Figure 5:
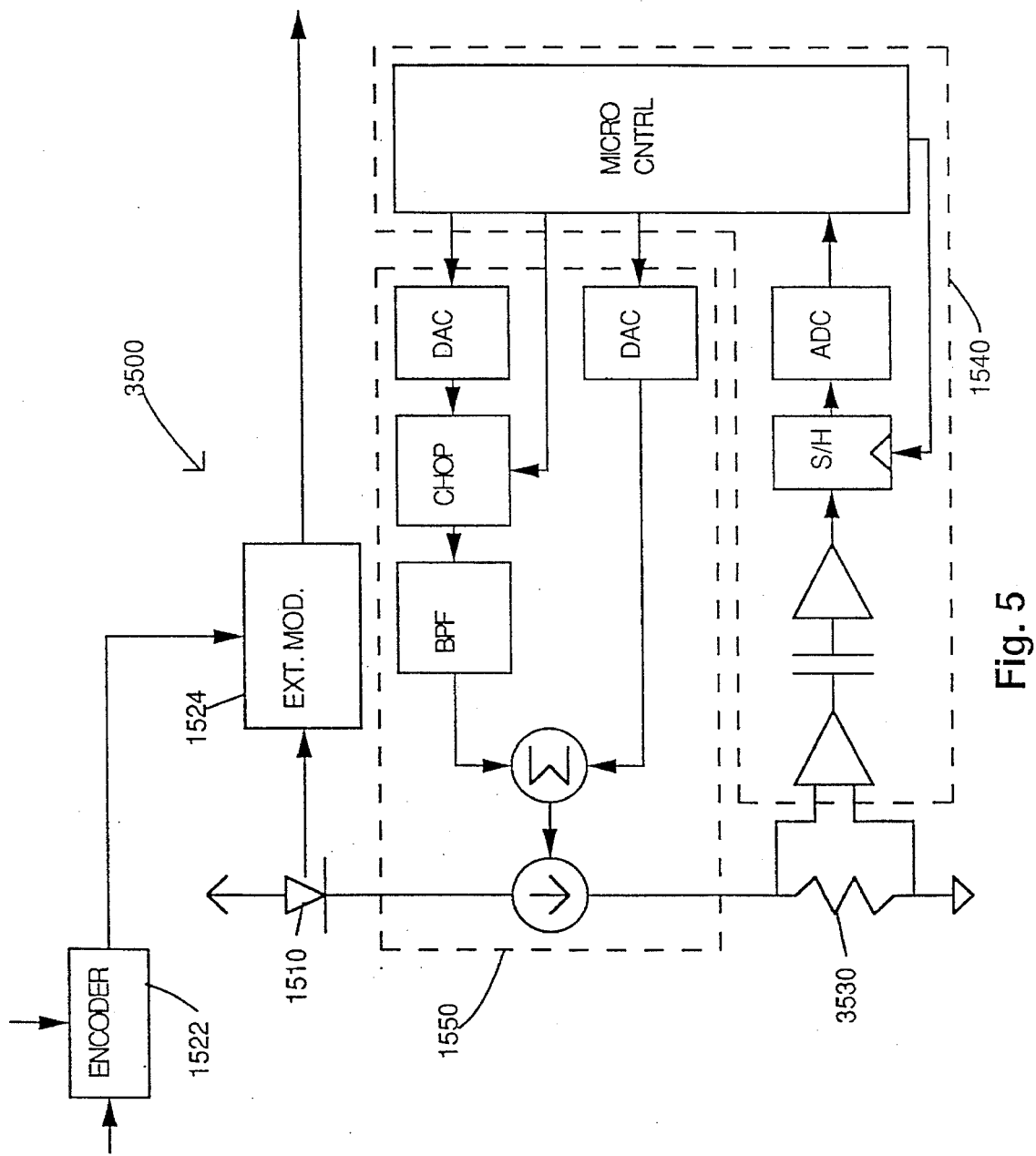
FIG. 5 is a block schematic diagram of an optical transmitter showing an alternative method for controlling an amplitude of a dither signal applied to an optical output of the optical transmitter.

FIG. 5 is a block schematic diagram of an optical transmitter 3500 showing an alternative method for controlling an amplitude of a dither signal applied to an optical output of the optical transmitter 3500. The optical transmitter 3500 comprises a semiconductor laser 1510, an encoder 1522, an external modulator 1524, a calculation arrangement 1540, and a dither amplitude control arrangement 1550 similar to those of the optical transmitter 1500 illustrated in FIG. 2. However, the optical tap 1532 and PIN diode 1534 of the previously described optical transmitter 1500 are replaced with a current sensing impedance 3530 which senses the bias current applied to the semiconductor laser 1510. The sensed bias current is processed in a manner similar to the photocurrent processing technique described above for the previously described optical transmitter 1500 and the results are fed back to provide precise control of the dither amplitude by precisely controlling the laser bias current.

Figure 6:
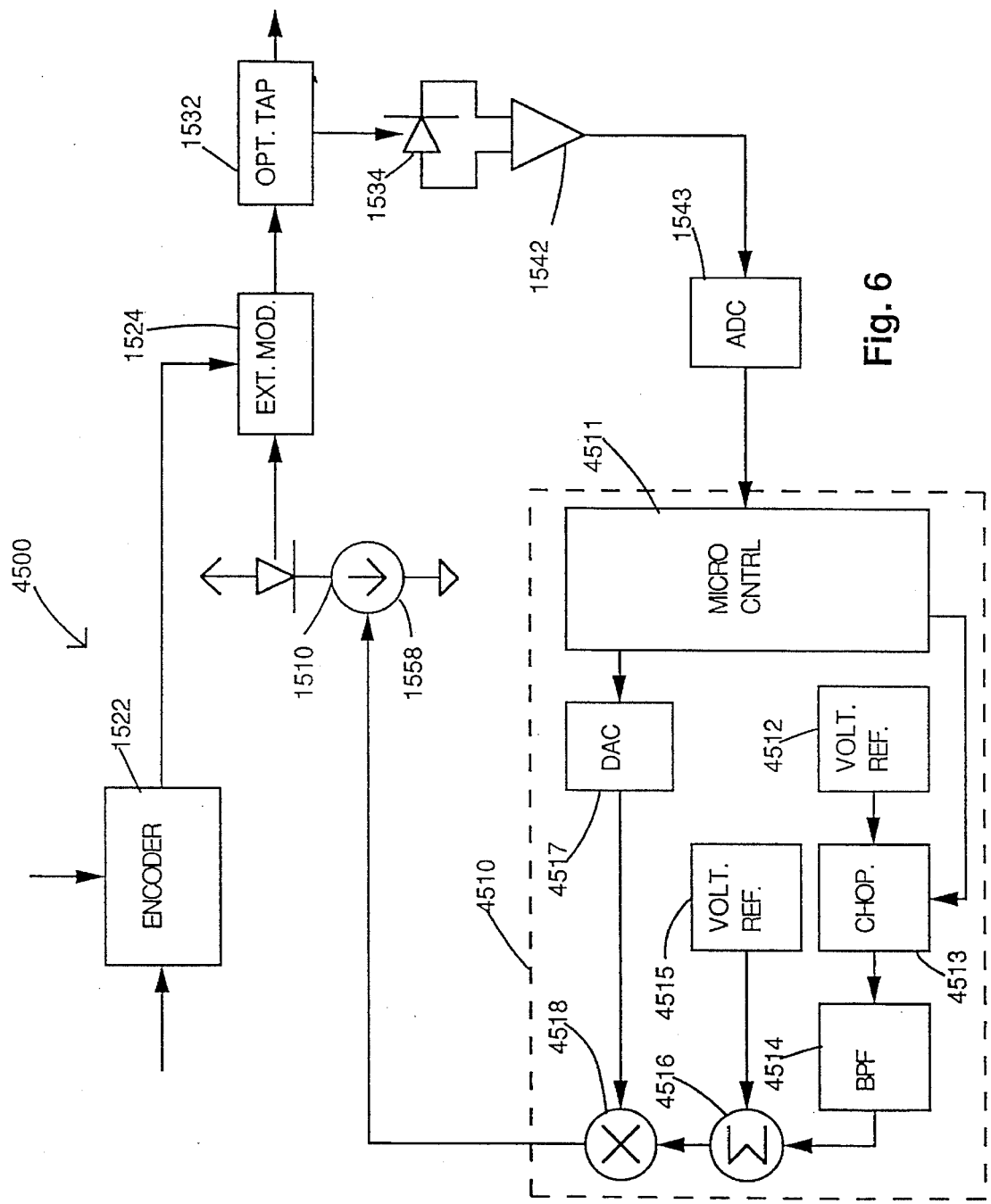
FIG. 6 is a block schematic diagram of an optical transmitter showing another alternative method for controlling an amplitude of a dither signal applied to an optical output of the optical transmitter.

FIG. 6 is a block schematic diagram of an optical transmitter 4500 showing another alternative method for precisely controlling a modulation depth of a dither signal applied to an optical output of the optical transmitter 4500. The optical transmitter 4500 comprises a semiconductor laser 1510, an encoder 1522, an external modulator 1524, and a voltage controlled current source 1558 similar to those of the optical transmitter 1500 illustrated in FIG. 2. The optical transmitter 4500 further comprises an optical tap 1532, a PIN diode 1534, a transimpedance amplifier 1542 and an analog to digital converter 1543 similar to corresponding components of the optical transmitter 1500 of FIG. 2 for estimating the average power of the optical output signal. However, a proportional injection circuit 1510 controls the dither modulation depth.

The proportional injection circuit 4510 comprises a microcontroller 4511, a first reference voltage generator 4512, a chopper 4513 and a band pass filter 4514. The first reference voltage generator 4512 applies a first DC analog signal to the chopper 4513, and the microcontroller 4511 controls the chopper 4513 to apply a pseudorandom dither modulation to the DC analog signal. The proportional injection circuit 4510 further comprises a second reference voltage generator 4515 and summer 4516 which sums a second DC analog signal supplied by the second voltage generator with the dither signal. The DC levels provided by the first and second reference voltage generators 4512, 4515 are fixed so as to provide a desired dither modulation depth. The proportional injection circuit further comprises a digital to analog converter 4517 which converts a digital code supplied by the microcontroller 4511 to an analog signal level, and an analog multiplier 4518 which multiplies the dither modulated output of the summer 4516 by the analog signal level. The resulting signal is applied to the voltage controllable current source 1558 to drive the semiconductor laser 1510.

The optical transmitter 4500 also comprises an optical tap 1532, a PIN photodetector 1534, a transimpedance amplifier 1542 and an analog to digital converter 1543 similar to those used in the optical transmitter 1500 of FIG. 2 to estimate the average optical output signal power. The microcontroller 4511 adjusts the digital code supplied to the digital to analog converter 4517 according to the estimated average optical signal power to keep the average optical signal power at a desired level. Such adjustments do not affect the dither modulation depth which is set by reference voltage generators 4512, 4515.

In the optical transmitters 1500 and 4500 of FIGS. 2 and 6 respectively, the optical taps 1532 could be eliminated by making the PIN photodetectors 1534 back facet monitors. Moreover, most of the analog functions have alternative digital embodiments and vice versa.

Figure 7:
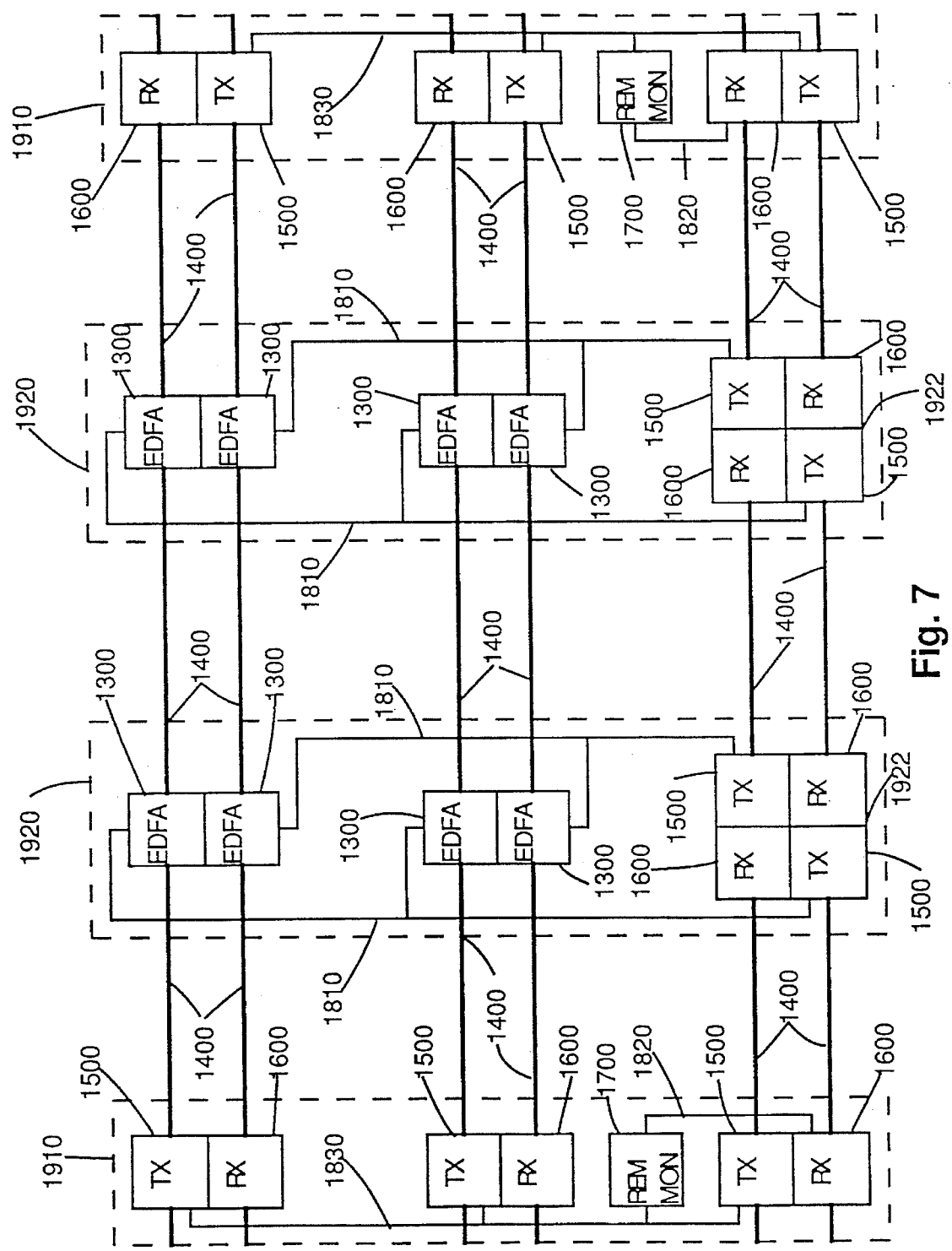
FIG. 7 is a block schematic diagram of a transmission system architecture showing an implementation of a remote monitoring bus of the transmission system of FIG. 1 in a telecommunications network comprising several transmission systems having common terminal locations.

The transmission system 1000 illustrated in FIG. 1 comprises a remote monitoring bus 1800 for transmission of monitored data from the EDFAs 1300 to the remote monitoring units 1700 of the optical terminals 1100. FIG. 7 is a block schematic diagram of a transmission system architecture showing how the remote monitoring bus 1800 may be implemented in a telecommunications network comprising several transmission systems having common terminal locations. As shown in FIG. 7, two transmission systems have optical transmitters 1500 and receivers 1600 located at terminal locations 1910 and EDFAs 1300 located at repeater locations 1920. A third transmission system has optical transmitters 1500 and receivers 1600 located at the terminal locations 1910 and optoelectronic regenerators 1922 comprising back-to-back optical transmitters 1500 and receivers 1600 at the repeater locations 1920. Local communications buses 1810 carry monitored data from the EDFAs 1300 at each repeater location 1920 to an optical transmitter 1500 of an optical regenerator 1922 at that repeater location 1920. The optical transmitter 1500 at the repeater location 1920 encodes the monitored data into overhead bits of the third optical transmission system for transmission to the terminal locations 1910. Optical receivers 1600 at the terminal locations 1910 decode the monitored data from the overhead bits of the third optical transmission system and supply the monitored data to remote monitoring units 1700 via local communications buses 1820. The remote monitoring units 1700 may send the monitored data to other optical transmitters 1500 at the same terminal location 1910 via local communications buses 1830 for transmission in overhead bits of the other optical transmission systems to other terminal locations. The remote monitoring unit 1700 may also send control signals based on the monitored data to the optical transmitters 1500 at the same terminal location 1910 via the local communications buses 1830.

In a practical transmission system architecture of the type illustrated in FIG. 7, several optical transmission systems may be provided with EDFAs 1300 at each repeater location 1920, and two optical transmission systems may be provided with optoelectronic regenerators 1922 at each repeater location. The optical transmission systems having EDFAs 1300 at each repeater location 1920 and one of the optical transmission systems having optoelectronic regenerators 1922 at each repeater location 1920 may provide normally working channels, and the other optical transmission system having optoelectronic regenerators 1922 at each repeater location 1920 may provide a protection channel for all of the working channels.

In the embodiments described above, a pseudorandom dither sequence is applied to the transmitted optical signal for performance monitoring and SBS suppression purposes. Dither modulation of a known and carefully controlled amplitude could also be provided for these purposes by applying one or more low frequency tones to the transmitted optical signal, and the amplitude of the dither modulation in tapped optical signals could be determined using known filtering techniques. Different tone frequencies could be used to distinguish optical signals having different dither modulation depths and different wavelengths.

These and other variations are within the scope of the invention as defined by the claims below.

We claim:

1. A method for monitoring the performance of an optical amplifier, comprising:

modulating an optical signal with a low frequency dither signal to provide a modulated optical signal having a known modulation depth, the low frequency dither signal encoding the known modulation depth;

tapping a portion of the optical signal at an optical output of an optical amplifier;

measuring a total power of the tapped portion of the optical signal, detecting the low frequency dither signal in the tapped portion of the optical signal to determine the known modulation depth and measuring a dither amplitude of the tapped portion of the optical signal; and estimating signal and noise components of the tapped portion of the optical signal based on the measured dither amplitude, the measured total power and the known modulation depth.

2. A method as defined in claim 1, wherein the low frequency dither signal is a Miller encoded pseudorandom sequence.

3. A method as defined in claim 2, wherein the low frequency dither signal is a bandpass filtered Miller encoded pseudorandom sequence.

4. A method as defined in claim 3, wherein the low frequency dither signal is a 64 kbps pseudorandom sequence which is Miller encoded and bandpass filtered to pass spectral components between 10 kHz and 40 kHz.

5. A method as defined in claim 1, comprising:

tapping the modulated optical signal at an optical output of an optical transmitter;

measuring a modulation depth of the tapped signal; and controlling the amplitude of the dither signal in response to the measured modulation depth.

6. A method as defined in claim 1, wherein the step of modulating an optical signal with a low frequency dither signal comprises modulating a bias current of a semiconductor laser with the low frequency dither signal.

7. A method as defined in claim 6, further comprising:

measuring a modulation depth of the bias current; and controlling the amplitude of the dither signal in response to the measured modulation depth.

8. A method as defined in claim 1, wherein the optical signal is tapped at an optical output of an optical amplifier, the method further comprising sending monitored data from the optical amplifier to at least one remote location for remote monitoring of the optical amplifier.

9. A method as defined in claim 8, further comprising encoding the monitored data into overhead bits of an optical signal at an optical transmitter for transmission to a terminal of the transmission system.

10. An optical transmission system, comprising:

an optical transmitter comprising an optical source for generating an optical signal, a signal modulation arrangement for modulating the optical signal with a high speed data stream, and a dither modulation arrangement for modulating the optical signal with a low speed, small amplitude dither signal having a precisely controlled dither modulation depth fixed at a known value, the known modulation depth being encoded in the dither signal;

an optical receiver; and a monitoring arrangement comprising an optical tap for tapping a portion of the optical signal, an opto-electronic conversion device for converting the tapped portion of the optical signal to an electrical signal, a dither signal detection arrangement for detecting the dither signal in the electrical signal and for determining the known modulation depth from the detected dither signal, and a calculation arrangement responsive to the electrical signal for estimating a total optical signal power of the optical signal and for estimating a dither amplitude of the optical signal.

11. An optical transmission system as defined in claim 10, further comprising at least one optical amplifier connected between the optical transmitter and the optical receiver, the optical tap of the monitoring arrangement tapping an optical output of the optical amplifier.

12. A method for monitoring the performance of a wavelength division multiplexed optical transmission system, the method comprising:

at each optical transmitter of the transmission system, modulating an optical signal with a low frequency dither signal to provide a modulated optical signal having a known modulation depth, the low frequency dither signal encoding the wavelength of the optical transmitter;

tapping a portion of the optical signal;

measuring a total power of the tapped portion of the optical signal, and measuring dither amplitudes of each distinct dither signal detectable in the tapped portion of the optical signal; and estimating both signal and noise components of the tapped portion of the optical signal by comparing the measured dither amplitudes to the measured total power.

13. A method as defined in claim 12, wherein the low frequency dither signals which encode distinct transmitter wavelengths are substantially orthogonal pseudorandom sequences.

14. A method as defined in claim 12, further comprising controlling relative signal powers of optical signals at distinct wavelengths in response to the measured dither amplitudes.

15. A method as defined in claim 14, wherein the optical signal is tapped at an optical output of an optical amplifier of the wavelength division multiplexed optical transmission system.

16. A method for monitoring the performance of an optical amplifier, comprising:

modulating an optical signal with a low frequency dither signal to provide a modulated optical signal having a known modulation depth;

tapping portions of the optical signal at both an optical input and an optical output of an optical amplifier;

measuring total powers and dither amplitudes for both tapped portions of the optical signal; and estimating signal and noise components for both tapped portions of the optical signal based on the measured dither amplitudes, the measured total powers and the known modulation depth.

17. Apparatus for monitoring performance of an optical transmission system, comprising:

an optical tap for tapping a portion of an optical signal at an optical output of an optical amplifier;

an opto-electronic conversion device for converting the tapped portion of the optical signal to an electrical signal; and a sampler for sampling the electrical signal to derive analog samples;

an analog to digital converter for digitally encoding the analog samples; and a microcontroller operable to correlate the digitally encoded samples with a known pseudorandom sequence to estimate the dither amplitude.

18. Apparatus for monitoring performance of an optical transmission system as defined in claim 17, wherein the microcontroller is operable to correlate the digitally encoded samples with a plurality of known pseudorandom sequences to estimate a plurality of dither amplitudes.

19. Apparatus for monitoring performance of an optical transmission system as defined in claim 17, further comprising an analog to digital converter for digitally encoding a DC level of the electrical signal which estimates a total signal power of the optical signal, wherein the microcontroller is operable to compare the estimated dither amplitude to the estimated total signal power to estimate a signal component and a noise component of the total optical signal power.

20. Apparatus for monitoring performance of an optical transmission system as defined in claim 17, further comprising:

an optical tap disposed so as to tap an optical input of the optical amplifier for tapping a portion of an optical input signal of the optical amplifier;

an opto-electronic conversion device for converting the tapped portion of the optical input signal to an electrical signal; and a calculation arrangement responsive to the electrical signal for estimating a total power of the optical input signal and for estimating a dither amplitude of the optical input signal.

21. Apparatus for monitoring performance of an optical transmission system as defined in claim 17, wherein the microcontroller is linked to a transmission channel for transmitting monitored data to a remote location.

22. An optical transmitter, comprising:

an optical source for generating an optical signal;

a signal modulation arrangement for modulating the optical signal with a high speed data stream; and a dither modulation arrangement for modulating the optical signal with a low speed, small amplitude dither having a precisely controller dither modulation depth fixed at a known value, the dither modulation arrangement comprising:

an opto-electronic conversion device for sensing the optical signal and for converting the sensed optical signal to an electrical signal;

a sampler for sampling the electrical signal to derive analog samples an analog to digital converter for digitally encoding the analog samples;

a microcontroller operable to estimate the dither amplitude based on the digitally encode samples; and a dither amplitude control arrangement responsive to the estimated total signal power and the estimated dither amplitude for fixing the dither amplitude at the known value, the dither amplitude control arrangement comprising:

a digital to analog converter responsive to a digital code supplied by the microcontroller to define an analog signal level;

a chopper responsive to a signal supplied by the microcontroller and to the analog signal level to define pulses having a pulse amplitude substantially equal to the analog signal level; and a controllable current source responsive to the pulses to modulate a bias current of the optical source.

23. An optical transmitter as defined in claim 22, wherein the microcontroller is operable to provide a signal to the chopper which defines a pseudorandom sequence and to correlate the digitally encoded analog samples with the pseudorandom sequence to estimate the dither amplitude.

24. An optical transmitter as defined in claim 23, wherein:

the microcontroller is operable to cycle through a Miller encoded pseudorandom sequence to generate a 64 kbps dither signal; and the dither amplitude control arrangement further comprises a band pass filter having a pass band between 10 kHz and 40 kHz.

25. An optical transmitted as defined in claim 22, wherein the dither modulation arrangement comprises:

a current sensing arrangement for sensing a bias current applied to the optoelectronic source;

a calculation arrangement responsive to the sensed bias current for estimating a total bias current and for estimating a dither amplitude of the bias current; and a dither amplitude control arrangement responsive to the estimated total bias current and the estimated dither amplitude for fixing the dither modulation depth of the bias current at the known value.

26. An optical transmitter as defined in claim 22, wherein the dither modulation arrangement comprises a proportional injection circuit for supplying a bias current to the optical source the bias current being modulated by the dither signal.

27. A wavelength division multiplexed optical transmission system, comprising:

a plurality of optical transmitters, each optical transmitter comprising an optical source for generating an optical signal at a distinct wavelength, a signal modulation arrangement for modulating the optical signal with a high speed data stream, and a dither modulation arrangement for modulating the optical signal with a distinct low speed, small amplitude dither signal having a precisely controlled dither modulation depth fixed at a known value;

a plurality of optical receivers, each optical receiver for receiving an optical signal from a corresponding optical transmitter; and a monitoring arrangement comprising an optical tap for tapping a portion of the optical signals, an opto-electronic conversion device for converting the tapped portion of the optical signals to an electrical signal, and a calculation arrangement responsive to the electrical signal for estimating a total optical signal power of the optical signals and for estimating a dither amplitude of each optical signal.

28. A wavelength division multiplexed optical transmission system as defined in claim 27, wherein the monitoring arrangement is located remote from the optical transmitters, the transmission system further comprising a monitoring unit located with the optical transmitters and a communication channel between the calculation arrangement and the monitoring unit for communicating monitored data from the monitoring arrangement to the monitoring unit.

29. A wavelength division multiplexed optical transmission system as defined in claim 28, wherein the remote monitoring unit is responsive to the monitored data to control an optical signal strength of the optical signals generated by each optical transmitter.

30. A wavelength division multiplexed optical transmission system as defined in claim 28, further comprising at least one optical filter, the optical filter being responsive to the monitored data to control relative strengths of optical signals at different wavelengths.

31. A wavelength division multiplexed optical transmission system as defined in claim 27, further comprising at least one optical amplifier connected between the optical transmitters and the optical receivers, each optical amplifier comprising an optical gain arrangement for amplifying optical signals from all of the optical transmitters, the monitoring arrangement being located at the optical amplifier.

32. A wavelength division multiplexed optical transmission system as defined in claim 31, wherein at least one optical amplifier is responsive to the monitored data to control an optical gain profile of the optical amplifier.

* * * * *

UNITED STATES PATENT AND TRADEMARK OFFICE
CERTIFICATE OF CORRECTION

PATENT NO. : 5,513,029
DATED : April 30, 1996
INVENTOR(S) : Kim B. Roberts, et. al.

It is certified that error appears in the above-indentified patent and that said Letters Patent is hereby corrected as shown below:

Title page, item [19] after "Roberts" insert --et al--.
Title page, item [75] inventor: should read "Inventors:" and after the name of the first inventor, "Kim B. Roberts, Kanata, Canada", the word "and the name of the co-inventor should be added as follows:
"Richard A. Habel, Ottawa, Canada".

Signed and Sealed this

Eleventh Day of February, 1997

Attest:

BRUCE LEHMAN

Attesting Officer    Commissioner of Patents and Trademarks